United States Patent Office

3,030,327
Patented Apr. 17, 1962

3,030,327
PROCESS FOR THE PREPARATION OF A POLY-
ACRYLATE COMPOSITION OF REDUCED
COMBUSTIBILITY AND PRODUCT OBTAINED
THEREBY
Ludwig J. Hosch, Darmstadt, Germany, assignor to Rohm
& Haas G.m.b.H., Darmstadt, Germany
No Drawing. Filed Apr. 11, 1958, Ser. No. 727,807
Claims priority, application Germany Apr. 15, 1957
12 Claims. (Cl. 260—30.6)

The present invention relates to polyacrylates, and more particularly to polyacrylates of reduced combustibility and to a process of producing the same.

Polyacrylates are commonly used in the formation of films, coatings, molded articles and the like. However, polyacrylates have one serious disadvantage in that they are readily combustible. While phosphoric acid esters have been proposed heretofore for use in reducing the combustibility of other synthetic materials, they are not suitable for use in reducing the combustibility of polyacrylates, since they do not sufficiently reduce the combustibility of polyacrylates. Moreover, phosphoric acid esters act as softeners in polyacrylates and hence they cannot be used when a hard polyacrylate product is desired.

Accordingly, it is an object of the present invention to provide polyacrylates having a combustibility which is greatly reduced when compared with heretofore known polyacrylates. It is a further object of the invention to provide a process for the preparation of polyacrylates having reduced combustibility.

The compositions of the present invention comprise a polyacrylate and a phosphoric acid added thereto to reduce the combustibility of the polyacrylate. Any phosphoric acid may be employed, such as orthophosphoric acid, pyrophosphoric acid, metaphosphoric acid, tripolyphosphoric acid and hexametaphosphoric acid. The preferred phosphoric acids, however, are orthophosphoric acid and pyrophosphoric acid. The phosphoric acid may be used in the form of a commercial product, for example, as an 85–90% aqueous orthophosphoric acid solution. The polyacrylate compositions contain a small amount of a phosphoric acid which generally lies in the range of from about 0.5% to about 20% of a phosphoric acid based on the weight of the monomeric components forming the polyacrylate.

The polyacrylates are either homopolymers of a monomeric acrylate or copolymers of a monomeric acrylate and an olefinic monomeric compound copolymerizable therewith. The relative amounts of the monomers forming the copolymeric polymerizate are not important, since any relative amounts thereof may be used in accordance with the polyacrylate product desired. Moreover, the degree of polymerization or the molecular weight of the polyacrylate is also not important, since the incorporation of a phosphoric acid into any polyacrylate will reduce the combustibility thereof regardless of its degree of polymerization.

The monomeric acrylates used in forming the homopolymeric or copolymeric polyacrylates are either salts or esters of acrylic acid or its lower alkyl derivatives, such as the alkyl (e.g., methyl, ethyl, propyl butyl, amyl, etc.), aryl (e.g., phenyl and naphthyl), arylalkyl (e.g., benzyl), and alicyclic (e.g., cyclopentyl, cyclohexyl, etc.), esters or the metallic and non-metallic salts (e.g., ammonium, sodium, potassium, calcium, barium, iron, monoethanolamine, triethanolamine, etc.) of acrylic acid, α-methacrylic acid (methacrylic acid), α,β-dimethylacrylic acid, β-ethylacrylic acid and β methylacrylic acid (crotonic acid). In forming the polyacrylates it is preferred to use the monomeric acrylates which are esters, rather than salts, of acrylic acid or its lower alkyl derivatives.

The olefinic monomeric compounds copolymerizable with the monomeric acrylates to form the polyacrylates include, for example, styrene, acrylonitrile, vinyl chloride, vinyl acetate, acrylic acid and its esters, methacrylic acid and its esters, dimethyl maleate, dimethyl fumarate, ethylene, vinylidene chloride, propylene and isobutylene.

Specific examples of polyacrylates which are either homopolymers or copolymers, therefore, include polyethylacrylate, polymethylmethacrylate, poly sodium acrylate, poly ammonium methacrylate, copolymer of methylmethacrylate and methacrylic acid, copolymer of methylmethacrylate and butylmethacrylate, copolymer of methylmethacrylate and styrene, copolymer of phenylacrylate and acrylonitrile, copolymer of benzylacrylate and vinyl chloride, copolymer of cyclopentylacrylate and dimethyl maleate, copolymer of ethylacrylate and propylene, copolymer of butylacrylate and isobutylene, copolymer of ethylcrotonate and vinylacetate, copolymer of potassium acrylate and methacrylic acid, copolymer of monoethanolamine methacrylate and vinyl chloride, and others readily apparent from the above definition of polyacrylates. The preferred polyacrylates, however, are polymethylmethacrylate and copolymers of methylmethacrylate with an olefinic monomeric compound copolymerizable therewith.

The polyacrylate compositions of the invention having reduced combustibility may be prepared by adding a phosphoric acid to a monomeric acrylate or to a mixture of a monomeric acrylate and an olefinic monomeric compound copolymerizable therewith, and then polymerizing the monomers to form a polyacrylate in the conventional manner. The polyacrylate compositions of the invention may also be prepared by adding a phosphoric acid directly to the polyacrylate after the polyacrylate has been formed by polymerization of its monomeric components. This may be done, for example, by rolling a phosphoric acid into a pearl-shaped polyacrylate prepared in accordance with the suspension-polymerization method at increased temperatures. Therefore, the process steps may be conducted in indifferent order, i.e., a phosphoric acid can be added to the monomers followed by polymerization of the monomers to form the polyacrylate or the monomers can be polymerized to form a polyacrylate and a phosphoric acid then added to the polyacrylate.

While the incorporation of a phosphoric acid into a polyacrylate produces a polyacrylate composition of reduced combustibility, it also increases the hydrophilic or water absorbing property of the polyacrylate. This hydrophilic property of the polyacrylate compositions, in general, is not desirable and can be avoided, if necessary, by various methods of which three are set forth below. These methods may be combined with one another, if desired.

The hydrophilic property of the polyacrylate compositions can be decreased by heating the polyacrylate at a temperature above its softening point, i.e., tempering the polyacrylate. The time and temperature of heating will, of course, vary with the particular polyacrylate being tempered.

In addition, the hydrophilic property of the polyacrylate compositions can be decreased by adding a cross-linking agent or net-forming agent to the monomers prior to polymerization thereof to form the polyacrylates. The cross-linking agents are compounds containing a minimum of two polymerizable carbon double bonds in the molecule, examples of which include glycol dimethacrylate, methacrylic acid anhydride, allyl and vinyl esters of acrylic acids, triallyl cyanurate and the dimethacrylic acid ester of 2,2-diphenylolpropane. A minor amount of a cross-linking agent is used which, in general, lies in the range of from about 1% to about 2% of the cross-linking agent based on the weight of the monomeric components forming the polyacrylate.

The hydrophilic properties of the polyacrylate compositions of the invention may also be decreased by adding a hydrophobic agent to the monomers prior to the polymerization thereof to form the polyacrylates. The hydrophobic agents include, for example, neutral phosphoric acid esters, such as trichloroethylphosphate, and silicone oils and paraffin oil. A minor amount of the hydrophobic agent is used, which, in general, lies in the range of from about 1% to about 5% of the hydrophobic agent based on the weight of the monomeric components forming the polyacrylate.

The incorporation of a phosphoric acid into polyacrylates to form polyacrylate compositions having reduced combustibility also makes possible the decrease or even the elimination of electrostatic pickup of materials, such as dust particles, by the polyacrylate compositions. Accordingly, the polyacrylate compositions need not be coated with anti-static agents as is now necessary for polyacrylates.

The compositions and process of the invention will be further illustrated by the following examples.

EXAMPLE 1

100 grams of 85% orthophosphoric acid was added to 1000 grams of methylmethacrylate and the mixture polymerized in the conventional manner in a glass chamber under the effect of 0.05% by weight of azo di-isobutyric acid dinitrile. A transparent plate was obtained which may be formed thermoplastically in accordance with known methods. The plate was tempered for one hour at 150° C. prior to its being worked.

EXAMPLE 2

A plate was prepared in accordance with Example 1. However, 1% of glycol dimethacrylate was added as a cross-linking agent to the monomer containing the orthophosphoric acid prior to polymerization thereof. As a result of the formation of cross-linkage or nets in the polyacrylate, this plate differed from the plate prepared in accordance with Example 1 by having improved heat stability and resistance against heat deformation.

EXAMPLE 3

150 grams of 90% orthophosphoric acid was added to a mixture of 625 grams of acrylonitrile and 225 grams of methylmethacrylate. 1.2 grams of azo di-isobutyric acid dinitrile was added to the mixture which was then polymerized in the known manner in a flat chamber. A slightly yellowish colored plate was obtained.

The products prepared in accordance with Examples 1 through 3 differ from the corresponding products prepared without the addition of a phosphoric acid by a reduction in combustibility to such an extent that although they may be burned in a hot flame, they do not either burn or smolder when removed from the flame.

In Table I below there are set forth Examples 4–19 further illustrating the compositions and process of the invention. In these examples a typical phosphoric acid, namely orthophosphoric acid or pyrophosphoric acid, was added to a representative monomeric acrylate, namely methylmethacrylate, or to a mixture of this monomeric acrylate and an olefinic monomeric compound copolymerizable therewith, and the monomers then polymerized in the known manner. In Example 13 a cross-linking agent was added to the mixture of monomers and a phosphoric acid prior to polymerization, while in Examples 12, 15, 16 and 18 a hydrophobic agent was added to the mixture of monomers and a phosphoric acid prior to polymerization. In all of the examples 0.05% of azo di-isobutyric acid dinitrile was present in the mixture being polymerized in order to effect polymerization.

The plates formed in Examples 4 through 19 of Table I below were subjected to two flame tests to determine their combustibility. The test designated in Table I below as KFT was a small flame test. In this test the polyacrylate plates of each of the examples were separately placed for 10 seconds in the non-luminous gas flame of a Teclu burner after the gas flame had been adjusted so that its height was 12–15 centimeters and the blue air cone had just disappeared from visibility. In case the plate being tested ignited during this 10 second exposure to the flame, it was left burning for 15 to 30 seconds.

The test designated as VFT in Table I below was an intensified flame test. Instead of exposing each of the plates of the examples to the flame for 10 seconds, the plates were each separately tested by being kept in the flame for 30 seconds.

The flame test rating or combustibility of the plates set forth in Table I below for flame tests KFT and VFT have the following meaning:

| Flame Test Rating | Definition of Rating |
| --- | --- |
| 1 | The test plate burns, and the flame expands quickly and cannot be extinguished by moving the test plate once or twice to the right and left. |
| 2 | The test plate burns, but the flame is moderate and cannot be extinguished by moving the test plate once or twice to the right and left. |
| 3 | The test plate burns, but the flame is extinguished by a slight draft of air. |
| 4 | The test plate burns, but the flame is extinguished by itself after a short time. |
| 5 | The test plate does not burn after removal from the flame or it is extinguished immediately. |

Accordingly, the polyacrylate test plates of the examples have a more reduced combustibility as the numerical values of the flame test ratings increase, i.e., the combustibility is inversely proportional to the flame test rating.

Example 19 has been included in Table I below as a comparative example to show the flame test rating of a polyacrylate which does not contain a phosphoric acid. In Table I the amounts of the components are in percent by weight.

Table I

| Example No. | Methylmethacrylate, percent | Olefinic Monomeric Compound | Orthophosphoric Acid (89% aqueous solution), percent | Pyrophosphoric Acid, percent | Other Additives | Flame Test Rating KFT | Flame Test Rating VFT |
|---|---|---|---|---|---|---|---|
| 4 | 92.5 | | 7.5 | | | 5 | 5 |
| 5 | 82.5 | 10% Methacrylic Acid | 7.5 | | | 5 | 5 |
| 6 | 82.5 | 10% Butylmethacrylate | 7.5 | | | 5 | 5 |
| 7 | 82.5 | 10% Acrylonitrile | 7.5 | | | 3 | |
| 8 | 82.5 | 10% Methylacrylate | 7.5 | | | 5 | 3 |
| 9 | 82.5 | 10% Benzylmethacrylate | 7.5 | | | 5 | 3 |
| 10 | 87.5 | 5% Methacrylic Acid Anhydride | 7.5 | | | 5 | 5 |
| 11 | 82.5 | 10% Styrene | 7.5 | | | 5 | 5 |
| 12 | 77.5 | 10% Methacrylic Acid | 7.5 | | 5% Trichloroethylphosphate | 5 | 5 |
| 13 | 80.5 | do | 7.5 | | 2% Allyl methacrylate | 5 | 4 |
| 14 | 82.5 | 10% Methylacrylate | | 7.5 | | 5 | 4 |
| 15 | 81.5 | 10% Methacrylic Acid | 7.5 | | 1% Paraffin Oil | 5 | 5 |
| 16 | 87.5 | 5% Methacrylic Acid | 2.5 | | 5% Trichloroethylphosphate | 5 | 5 |
| 17 | 85 | do | 10 | | | 5 | 5 |
| 18 | 84 | 10% Methacrylic Acid | 5 | | 1% Silicone Oil (DC702)¹ | 5 | 5 |
| 19 | 100 | | | | | 1 | 1 |

¹ Dow Corning 702 is a methyl phenyl silicone oil or fluid sold by the Dow Corning Corporation.

From a comparison of the flame test ratings of Examples 4 through 18 with Example 19 in Table I above, it is readily apparent that the polyacrylate compositions of the invention containing a phosphoric acid have a greatly reduced combustibility in contrast to a polyacrylate which does not contain a phosphoric acid.

The compositions and process of the invention have been illustrated in the above examples using methylmethacrylate as the monomeric acrylate to form a homopolymeric or copolymeric polyacrylate. It will be appreciated, however, that other monomeric acrylates as set forth above can be used in the formation of polyacrylates containing a phosphoric acid and that such polyacrylate compositions have comparable flame test ratings. In addition, phosphoric acids other than orthophosphoric acid and pyrophosphoric acid, such as those set forth above, can also be used in the polyacrylate compositions and produce comparable results in regard to reduced combustibility of the polyacrylates.

It would be further appreciated that the compositions and process of the invention may be modified by those skilled in the art without departing from the spirit thereof, and that accordingly the compositions and process of the invention are to be limited only within the scope of the appended claims.

I claim:

1. A process for the preparation of a polyacrylate composition of reduced combustibility which comprises (1) adding to a monomeric material selected from the group consisting of (a) a monomeric acrylate and (b) a mixture of a monomeric acrylate and an ethylenically unsaturated monomer copolymerizable therewith from about 0.5% to about 20% of a phosphoric acid based on the weight of the monomeric material, and (2) heating the resulting mixture to polymerize the monomeric material and thereby form a polyacrylate having the phosphoric acid incorporated therein.

2. A process as set forth in claim 1 which comprises also adding a minor amount of a cross-linking agent having at least two vinylidene groups therein to the monomeric material before polymerization thereof.

3. A process as set forth in claim 1 which comprises also adding a minor amount of a hydrophobic agent to the monomeric material before polymerization thereof.

4. A process as set forth in claim 1 which comprises also heating the polyacrylate at a temperature above its softening point to decrease its hydrophilic property.

5. A process as set forth in claim 1 wherein the phosphoric acid is orthophosphoric acid.

6. A process as set forth in claim 1 wherein the phosphoric acid is pyrophosphoric acid.

7. A process as set forth in claim 1 wherein the monomeric material is methylmethacrylate and the polyacrylate is polymethylmethacrylate.

8. A process as set forth in claim 1 wherein the monomeric material is a mixture of methylmethacrylate and methacrylic acid and the polyacrylate is a copolymer of methylmethacrylate and methacrylic acid.

9. A polyacrylate composition of reduced combustibility produced by the process of claim 1.

10. A polyacrylate composition of reduced combustibility produced by the process of claim 2.

11. A polyacrylate composition of reduced combustibility produced by the process of claim 3.

12. A polyacrylate composition of reduced combustibility produced by the process of claim 4.

References Cited in the file of this patent

UNITED STATES PATENTS

| | | |
|---|---|---|
| 2,519,348 | Burnell | Aug. 22, 1950 |
| 2,669,521 | Bierly | Feb. 16, 1954 |
| 2,833,753 | Joginder | May 6, 1958 |

FOREIGN PATENTS

| | | |
|---|---|---|
| 733,559 | Great Britain | July 13, 1955 |

OTHER REFERENCES

"Lucite," Manual, Du Pont, page 117.